UNITED STATES PATENT OFFICE.

GEORGES REYNAUD, OF PARIS, FRANCE.

PROCESS FOR THE INDUSTRIAL MANUFACTURE OF ARTIFICIAL RUBBER.

1,032,423.

Specification of Letters Patent.

Patented July 16, 1912.

No Drawing.

Application filed October 28, 1910. Serial No. 589,518.

*To all whom it may concern:*

Be it known that I, GEORGES REYNAUD, of 5 Rue Salneuve, in the city of Paris, Republic of France, engineer, have invented a Process for the Industrial Manufacture of Artificial Rubber, of which the following is a full, clear, and exact description.

This invention relates to a process permitting of the industrial manufacture of rubber under very economical conditions.

This process is based essentially on the fractional action of sulfuric acid, at progressive degrees of concentration, upon the oil of turpentine, or other similar oil, in a very divided state in an absorbent material, such as non vulcanized rubber.

The present process can be carried out in the following manner: The oil of turpentine to be treated is poured into a vessel, and rubber, preferably under the form of sheets or ribbons, is plunged therein (for instance 5 to 6 kilograms of oil of turpentine and 1 kilogram of rubber). At the beginning of the operation, natural rubber or rubber obtained by any process whatever is taken and then the rubber obtained by means of the present process will be used. When the entire quantity of oil of turpentine has been absorbed by the rubber, the whole mass is plunged into very dilute sulfuric acid, for example in acid at 60° Baumé, diluted in from four to five times its volume of water and it is left to macerate therein during a time long enough to allow of the whole mass to be thoroughly impregnated with the acid, for instance for 12, 18, 24 hours, according to the thickness of the mass to be treated. By reason of the low degree of concentration of the acid and of the division of the oil, this acid acts upon the latter in a slow and regular manner, without producing any remarkable rise of the temperature. When the mass is thoroughly impregnated with the acid solution, it is submitted to the action of a solution of sulfuric acid slightly more concentrated, for instance in acid at 60° B. diluted in from two to three times its volume of water, said mass being left to macerate therein for a few hours, until said acid solution has impregnated in its turn the entire mass. The material is then submitted to the action of a more concentrated solution of sulfuric acid, for instance in acid at 60° B., diluted in from once to twice its volume of water; finally when said material has been thoroughly impregnated with this acid solution it is placed into sulfuric acid at 60° B. or above and it is left to macerate therein for a time long enough to enable the acid to react upon all the points of the mass (for instance for twelve to fifteen days) and to transform completely the latter. Acid at 63° B. will preferably be used and in this case the time for maceration may last even one month and more.

For carrying out the various operations described above, for the purpose of obtaining a homogeneous product and to considerably diminish the duration of these operations, the material to be treated and the acid may be caused to pass simultaneously between compressing rolls.

All the operations of the present process must be carried out in such a manner that the material is impregnated with the acid solution uniformly at all its points, in order to avoid, toward the end of the process, any direct contact of oil of turpentine with a concentrated acid solution, for in this case, as experience has shown, the temperature becomes so high as to be capable of carbonizing the material. By this fractional and progressive action of the sulfuric acid, the transformation of the oil of turpentine into an elastic material is therefore carried out slowly, in a very regular manner, without any rise of the temperature nor any risk of resinification of the oil. The elastic material thus obtained, after a washing in pure water or water to which an alkali has been added, possesses all the physical and chemical properties of rubber and consequently, is capable of receiving all the industrial applications of the latter.

By means of the present process, the manufacture of rubber is carried out entirely in the cold; therefore it does not comprise any dangerous handling, nor require special apparatus and, consequently can be carried out in an easy, very simple and economical way.

The present process can also be carried out as follows: As previously, non-vulcanized rubber is caused to absorb oil of turpentine (for instance, from 2 to 3 kilograms of oil of turpentine to 1 kilogram of rubber). When the whole quantity of the oil of turpentine is absorbed by the rubber, the entire mass is plunged into sulfuric acid at 53° B. diluted in about one third or one fourth of its volume of water and said mass is left to macerate therein, as mentioned above, during a fairly long time, for instance, for 12, 18, 24 hours, according to the thickness of the mass to be treated, or during a shorter duration of time if the material and the acid are submitted to the action of compressing rolls. When said mass is thoroughly impregnated with this acid solution, it is submitted to the action of a more concentrated acid solution, at 53° B. for instance; it is left to macerate therein during some hours, until said acid has impregnated in its turn the entire mass. Under this fractional and progressive action of the sulfuric acid, the oil of turpentine is transformed, as mentioned above, into a pasty and slightly sticky elastic material. Then the said material is washed in running water to remove the excess of sulfuric acid. The material thus obtained can be utilized industrially but it is preferably treated subsequently with hydrochloric acid in the following manner: The said elastic material is placed in a bath of concentrated hydrochloric acid and left to rest for some hours, so that the acid can thoroughly penetrate the mass. Finally it is boiled for some hours, the acid having previously been diluted with water, for instance with two or three times its volume of water. A firm and tough product is thus obtained, which, freed from its impurities by energetic washing in pure water or water to which an alkali has been added, possesses all the physical properties of natural rubber. In this second *modus operandi*, the treatment with sulfuric acid is, as in the first method described, carried out entirely in the cold and presents therefore the advantages indicated above.

In the present process, instead of oil of turpentine, oils can be used obtained from any terebinthaceæ or oils produced by the dry distillation of the resinous lamellæ of *Xanthorrhœa* and all other plants or shrubs which yield similar oils.

Claims:

1. A process for the industrial manufacture of rubber, consisting in causing an absorbent material, such as non-vulcanized rubber, to absorb oil of turpentine for the purpose of dividing said oil in treating said material, thus divided in said absorbent material, with diluted sulfuric acid and in then treating the product thus obtained with sulfuric acid at a higher degree of concentration.

2. A process for the industrial manufacture of rubber, consisting in causing an absorbent material, such as non-vulcanized rubber, to absorb oil of turpentine for the purpose of dividing said oil in treating said material, thus divided in said absorbent material, first with very diluted sulfuric acid, then successively with various solutions of sulfuric acid at progressive degrees of concentration at 60° B. or above, the process being entirely carried out in the cold.

3. A process for the industrial manufacture of rubber, consisting in causing an absorbent material, such as non-vulcanized rubber, to absorb oil of turpentine, for the purpose of dividing said oil, in treating said material, thus divided in said absorbent material, with diluted sulfuric acid, in treating then the product thus obtained with sulfuric acid at a higher degree of concentration, and in treating the product resulting from the previous operation first in the cold with concentrated hydrochloric acid and finally with diluted hydrochloric acid brought to the boiling point.

4. The rubber product resulting from the treatment of oil of turpentine divided by means of an absorbent material, such as non-vulcanized rubber, by the fractional action of sulfuric acid at progressive degrees of concentration.

The foregoing specification of my process for the industrial manufacture of rubber signed by me this 18th day of October 1910.

GEORGES REYNAUD.

Witnesses:
H. C. COXE,
R. EHIRIOT.

Copies of this patent may be obtained for five cents each, by addressing the "Commissioner of Patents, Washington, D. C."